United States Patent [19]
Griffin

[11] 3,981,113
[45] Sept. 21, 1976

[54] WINDOW GLASS BONDING STRIP

[75] Inventor: Henry W. Griffin, Birmingham, Mich.

[73] Assignee: General Motors Corporation, Detroit, Mich.

[22] Filed: May 12, 1975

[21] Appl. No.: 576,806

[52] U.S. Cl. .................. 52/208; 52/397; 296/93
[51] Int. Cl.² ............ B60J 1/02; E06B 3/62; E06B 3/02
[58] Field of Search ........... 52/208, 400, 401, 402, 52/397, 398; 296/93

[56] References Cited
UNITED STATES PATENTS

| 3,416,833 | 12/1968 | Griffin | 52/208 |
| 3,478,475 | 11/1969 | Strack | 52/397 |
| 3,672,109 | 6/1972 | Erck | 52/397 |
| 3,742,649 | 7/1973 | Dochnahl | 52/397 |

*Primary Examiner*—John E. Murtagh
*Attorney, Agent, or Firm*—C. E. Leahy

[57] ABSTRACT

A bonding strip for mounting a window glass on a vehicle body panel flange is extruded from a resilient adhesive butyl rubber compound and includes a body portion which defines a recess for receiving the edge of the window glass and an underface which faces toward the body panel flange. The bonding strip also has a leg which is integral with the body portion and extends from one edge of the underface at an acute angle toward the other edge of the underface. A bead of highly viscous pumpable liquid butyl rubber is applied along the body panel flange. When the glass is installed against the body panel flange, the leg of the bonding strip is engaged against the bead of highly viscous liquid butyl and causes the bead of liquid butyl to flow to fill any spaces resulting from surface unevenness of the body panel flange. The weight of the window glass causes the leg of the bonding strip to be folded back into engagement with the underface of the body portion whereby one face of the leg is adhered to the underface of the body portion and the other face of the leg is adhered to the body panel flange by the liquid butyl rubber when it is cured.

2 Claims, 3 Drawing Figures

WINDOW GLASS BONDING STRIP

The invention relates to a window glass installation for a motor vehicle body and more particularly provides a preformed adhesive bonding strip of butyl rubber for mounting the window glass to a body panel flange.

It is known to mount a window glass on the flanged body panels of a vehicle body by use of an adhesive bonding strip of butyl rubber. Such butyl rubber bonding strips are characterized by surface tackiness or adhesion which is effective to join a glass surface to a painted metal surface. The known butyl rubber bonding strips are preformed in a generally rectangular cross-section and are applied to either the face of the glass or the face of the body panel flange and are squeezed between the window glass and the body panel flange when the window glass is fitted into the body panel opening. Clamping fixtures are employed to compress the bonding strip into contact with the surfaces of the window glass and the flange for a sufficient time to ensure that the bonding strip is adhered to both the window glass and the body panel flange.

The object of the invention is to provide a window installation utilizing a bonding strip having a collapsible configuration which eliminates the need for clamping fixtures to compress the bonding strip during mounting of the window glass on the body panel flange.

According to the invention, a bonding strip is extruded from a butyl rubber compound. The extruded shape of the bonding strip includes a body portion which defines a recess for receiving the edge of the window glass and an underface which faces toward the body panel flange. The butyl rubber compound utilized in the bonding strip is resilient and further characterized by a tackiness or adhesion which causes it to adhere to the edge of the glass. A liquid butyl primer is preferably used to wet the engaging surfaces of the glass and bonding strip to enhance the adhesion therebetween. The bonding strip also has a leg which is integral with the body portion and extends from along one edge of the underface at an acute angle toward the other edge of the underface. A bead of highly viscous pumpable liquid butyl rubber is applied along the body panel flange. When the glass is fitted into the body opening, the leg of the bonding strip is applied against this bead of highly viscous liquid butyl and causes the bead of liquid butyl to flow to fill any spaces resulting from surface unevenness of the body panel flange. The weight of the window glass causes the leg of the bonding strip to collapse whereby it is folded back into engagement with the underface of the body portion and the leg is adhered to the underface of the body portion by virtue of the adhesive nature of the butyl rubber compound.

One feature of the present invention is the provision of a collapsible butyl rubber bonding strip applied to the edge of a window glass and a highly viscous liquid butyl rubber applied to the flange of the vehicle body panel.

Another feature of the invention is an extruded bonding strip having a recess for receiving the edge of the window glass and a leg extending from the body portion, the leg collapsing under the weight of the glass to fold back into engagement of the body portion and be adhered thereto.

These and other features, objects and advantages of the invention will become apparent upon consideration of the specification and the appended drawings in which.

Figure 1:
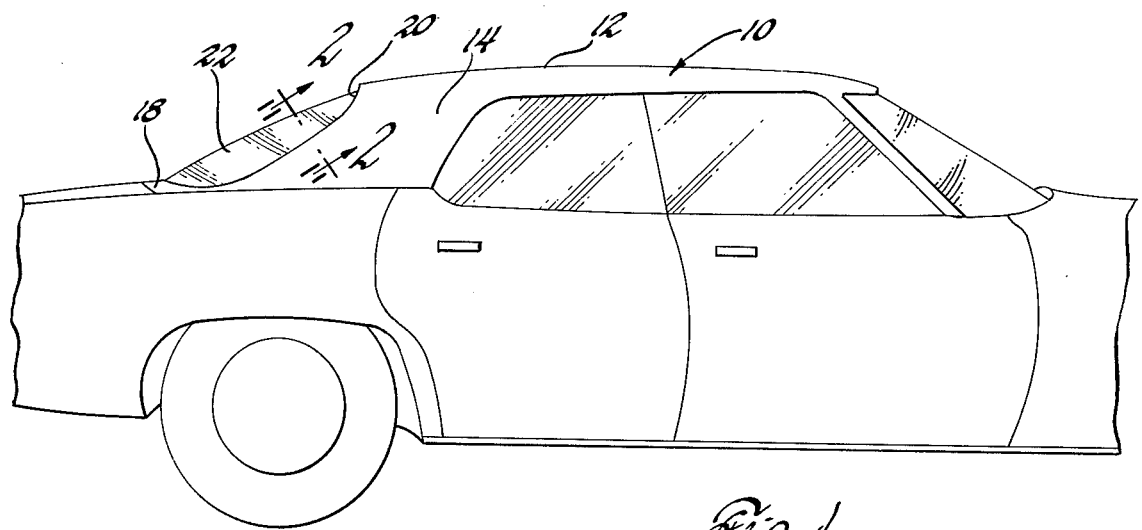
FIG. 1 is a side view of a motor vehicle body.

Referring to FIG. 1, a vehicle body 10 includes a conventional roof structure 12 including a sail panel 14. A filler panel 18 connects the lower ends of the sail panel 14. The roof structure 12, sail panel 14 and filler panel 18 provide body panel flanges which cooperate to define a flanged window opening 20 closed by a fixed window glass 22.

Figure 2:
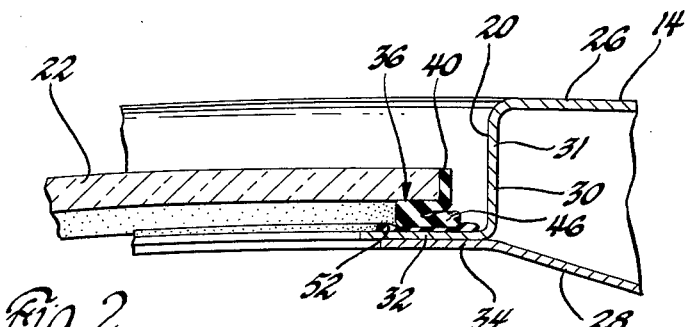
FIG. 2 is a sectional view taken in the direction of arrows 2—2 of FIG. 1 and showing the window glass installation.

Referring to FIG. 2, it will be seen that the sail panel 14 includes an outer panel 26 and an inner panel 28. Outer panel 26 includes an inwardly offset flange 30 including a wall 31 extending generally normal to the surface of the window glass 22 and a wall 32 extending generally parallel to the surface of the window glass 22. The inner panel 28 includes a flanged portion 34 which is juxtaposed to the wall 32 and is conventionally pinch-welded thereto. The roof structure 12 and the filler panel 18 each have conventional inwardly offset flanges similar to the flange 30 of the sail panel 14 and cooperate therewith to provide the flanged body opening 20.

Figure 3:
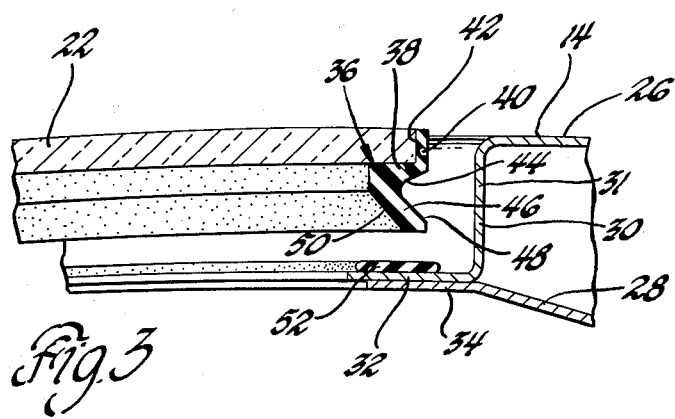
FIG. 3 is a view similar to FIG. 2 but showing the window glass in position just prior to installation.

Referring to FIG. 3, a bonding strip 36 of a butyl rubber compound is extruded in the shape shown in FIG. 3 and includes a body portion 38 having an integral lip 40 which defines a recess 42 for receiving the edge portion of the window glass 22. The butyl rubber compound is resilient and also characterized by being tacky so that it adheres to both glass and painted metal. The surfaces of the bonding strip 36 defining the recess 42 are preferably coated with a liquid butyl primer which enhances the adhesion of the bonding strip 36 to the window glass 22.

The bonding strip 36 has an underface 44 which faces toward the wall 32 of the inwardly offset flange 30 and also has a leg 46 which is extruded continuously and integral with the body portion 38. As seen in FIG. 3, the leg 46 extends from along the leftward or inner edge of the underface 44 of the bonding strip 36 and is angled outwardly toward the rightward or outer edge of the underface 44. The leg 46 has a face 48 and a face 50.

A bead 52 of highly viscous pumpable liquid butyl rubber is applied along the face of the wall 32 of the inwardly offset flange 30. When the window glass 22 is fitted into the body opening 20, the leg 46 of the bonding strip 36 engages the bead 52 of highly viscous liquid butyl rubber. The leg 46 squeezes the bead 52 of liquid butyl rubber and the leg 46 is caused to fold back so that its face 48 engages the underface 44 of the body portion 38 and is adhered thereto as seen in FIG. 2 by the tackiness of the bonding strip. The bead of highly viscous butyl rubber flows to fill any unevenness or irregularities which may have been formed in the surface of the wall 32 of the inwardly offset flange 30 by the pinch welding of the flange. Furthermore, variations of distance between the wall 32 and the surface of the window glass 22 are compensated for by the varying extent to which the bead 52 of liquid butyl rubber is squeezed to the side and by the varying extent to which the leg 46 will fall back into adhesive engagement with the body portion 44.

The liquid butyl rubber of the bead 52 contains solvents which react with the paint to enhance adhesion thereto and are evaporated in a short time leaving a solid body of butyl rubber which is adhered to both the wall 32 of the inwardly offset flange 30 and the face 50 of the bonding strip leg 46. Thus, the resilient nature of the bonding strip 36 and the configuration of the underface 44 and leg 46 result in collapse of the bonding strip to the position of FIG. 2 by virtue of the weight of the window glass 22 and the normal pressure applied thereagainst during installation of the window glass 22, thereby eliminating the necessity of clamps to hold the bonding strip under pressure between the flange and the glass.

What is claimed is:

1. In a motor vehicle body having a window opening defined by a body panel flange and a window panel for closing the window opening when mounted therein, an extruded resilient bonding strip adhesively connecting the window panel to the body panel flange and adhesively providing the sole means mounting the window panel on the body panel flange, said bonding strip comprising: an extruded strip of resilient material having a tacky outer surface, said bonding strip having a body portion engaging and adhesively securing the bonding strip to the edge of the window panel, the body portion having a tacky underface facing toward the body panel flange and a continuous leg extruded integrally with the body portion of the bonding strip and depending therefrom at an acute angle with respect to the underface, said leg having first and second tacky faces, the leg engaging the body panel flange when the window panel is installed in the window opening so that the leg is folded back with one tacky surface engaging the tacky underface of the body portion and adhesively securing said leg to said body portion and the other face engaging and being adhesively secured to the body panel flange to adhesively mount said window panel on the body panel flange solely by the adhesion of the bonding strip.

2. In a motor vehicle body having a window opening defined by a body panel wall and a window panel having an edge portion contoured to match the contour of the body panel wall for closing the window opening when mounted therein, means for adhesively mounting the edge portion of the window panel on the body panel wall irrespective of contour variations between the window panel and the body panel wall, said adhesive mounting means comprising: a bead of curable highly viscous liquid butyl applied to the body panel wall, and a preformed continuous adhesive bonding strip extending continuously around the edge portion of the window panel and having a tacky outer surface, said bonding strip having a body portion adhesively secured to the edge portion of the window glass by the adhesion of the tacky surface, said bonding strip having a tacky underface facing the body panel flange and a continuous leg depending from the underface at an acute angle with respect thereto and having first and second tacky faces, the leg engaging the liquid butyl as the window panel is inserted into the window opening whereby the leg is folded back into engagement with the body portion by the weight of the window panel and one face of the leg is adhered to the underface of the body portion and the other face is adhered to the curable liquid butyl, any variation of contour between the window panel and body panel wall being accommodated by flow of the curable liquid butyl and by variation in the extent to which the leg is folded back into adhesive engagement with the underface of the body portion.

* * * * *